United States Patent [19]

Hildreth et al.

[11] 4,345,554

[45] Aug. 24, 1982

[54] VEHICLE ENGINE REMOTE STARTER CONTROL AND PROTECTIVE SYSTEM

[76] Inventors: Donald M. Hildreth, 4011 Garden Ave., Los Angeles, Calif. 90039; Edward P. Tyler, 10644 Tuxford St., Sun Valley, Calif. 91352

[21] Appl. No.: 95,260

[22] Filed: Nov. 19, 1979

[51] Int. Cl.³ .............................................. F02N 17/00
[52] U.S. Cl. .......................... 123/179 BG; 290/38 R; 290/37 R; 123/335
[58] Field of Search ........ 123/179 R, 179 B, 179 BG, 123/335, 352; 290/37 R, 37 A, 38 R

[56] References Cited

U.S. PATENT DOCUMENTS

| | | | |
|---|---|---|---|
| 3,514,621 | 5/1970 | Farmer et al. | 290/37 R |
| 3,602,207 | 8/1971 | Kilmer | 290/38 X |
| 3,731,108 | 5/1973 | Kobara et al. | 29/37 X |
| 3,811,049 | 5/1974 | Hildreth et al. | 290/37 X |
| 3,866,059 | 2/1975 | Przywozny | 290/38 R |
| 4,045,062 | 8/1977 | Disosway et al. | 290/38 R |
| 4,070,585 | 1/1978 | Parkyn | 290/38 R |
| 4,192,279 | 3/1980 | Maisch et al. | 123/335 |
| 4,198,933 | 4/1980 | Sieber et al. | 123/352 |

Primary Examiner—P. S. Lall
Attorney, Agent, or Firm—Paul A. Weilein

[57] ABSTRACT

A remotely controlled engine starter and protective system, particularly for engine driven vehicles, in which a remotely located radio transmitter is utilized to initiate energization of the starter motor; a first timer opens the starter circuit if the engine does not start in approximately ten seconds, and if the engine starts, a second timer is operative to stop the engine after approximately ten minutes. Protective features are also provided to cut off power to the starter motor and ignition system in the event that the engine speed reaches a preset overspeed level; the vehicle is physically moved in a forward or reverse direction; automatically initiate starting of the engine when the ambient temperature falls below a preset level; cut off the system and prevent restarting for a period of 5 seconds, when the engine RPM is less than a preset level for a period of one second; cut off power to the starter motor when a preset running RPM of the engine is obtained; and delay energization of accessories for a period of 30 seconds after a starting operation is successfully initiated.

7 Claims, 5 Drawing Figures

REMOTE STATION 4,345,554

VEHICLE ENGINE REMOTE STARTER CONTROL AND PROTECTIVE SYSTEM

BACKGROUND OF THE INVENTION

The present invention relates generally to a remote control starting system for an internal combustion engine, and is more particularly concerned with an improved remote starter control and protective system for a vehicle engine, and especially automotive vehicles.

Numerous remote and automatic engine starting systems are disclosed in the prior art, as exemplified, for example, by the following U.S. Pat. Nos. 2,952,782; 3,172,400; 3,357,417; 3,478,730; 3,532,895; 3,553,472; and 3,790,806. Such prior art systems, however, fall far short of the ideal for various reasons. Among the reasons are complexity, installation difficulties, operational shortcomings due to lack of adequate protective means, undue cost, and failure to achieve satisfactory reliability for a reasonably long service life.

The invention is more specifically concerned with improvements in remote control engine starter control systems of the type disclosed in our prior U.S. Pat. No. 3,811,049 which is incorporated herein by reference. In the arrangement disclosed in this patent, in addition to the usual electrical circuit for the ignition system and the starter motor, the engine is provided with a parallel auxiliary circuit that is closed by remote control. A first timer opens the auxiliary circuit if the engine does not start in approximately ten seconds. If the engine does start, a second timer opens the auxiliary circuit in approximately ten minutes to stop the engine. When the engine starts, a switch means of a vacuum actuator de-energizes both the starter motor and the ten second timer. At the same time, the throttle advance means of the vacuum actuator, which advanced the throttle prior to engine starting, acts to slowly allow the throttle to move to the normal engine-idle position. After the engine starts, the switch means of the vacuum actuator turns on either the heater or the air conditioner, and in addition creates a signal to indicate the starting of the engine. The created signal may be used to energize one or more of the horn, the vehicle emergency lights, and a radio transmitter.

SUMMARY OF THE INVENTION

The present invention proposes to expand and augment the basic control system of our previously mentioned patent, by the incorporation of additional operating features and protective means to the end that more reliable and dependable control of the vehicle and its engine may be obtained. Briefly, these features and objects may be enumerated, as follows:

1. ENGINE OVERSPEED CUTOFF: If the engine speed should exceed a preset operating level, for example, 3500 RPM, because of some mechanical malfunction, then switching means will be operative to remove all power to the starter and ignition system.

2. MOTION DETECTOR CUTOFF: Switching control is arranged to respond to forward or reverse physical movement of the vehicle in a manner to remove power to the starter and ignition system in the event, for example, the gear shift lever of an automatic transmission should inadvertently be moved for some reason from a "park" or "neutral" position into a "driving" position, or in the case of a manual shift transmission, it is inadvertently left in gear.

3. LOW TEMPERATURE ACTIVATION: A low temperature sensor is arranged to start the engine when the ambient temperature falls below a preset level. Thus, in cold climates, vehicles may be started automatically, as necessary, in order that vital parts and lubrication may be kept warm and operable.

4. STARTER NO-LOAD CUTOFF: If the engine is commanded to start and its RPM is less than a preset level for a period of 1 second, then a second timer operates to cut off the system and prevent its activation by another start command for a period of 5 seconds. Such operation is beneficial in that, if the starter motor fails to engage the flywheel and turn the engine over, power will be disconnected from the starter motor and thus prevent burn-out. The 5 second command lockout permits the starter motor to wind down before a re-start is attempted.

5. RPM SENSOR: This sensor is arranged to cut off power to the starter motor when the engine speed exceeds a preset level of approximately 250 RPM (indicating that the engine is running).

6. ACCESSORIES TIMER: This timer is arranged to turn on the accessories after a time interval of 30 seconds from the activation of the system. The electrical load on the battery is thereby reduced during starting.

Further objects and features of the invention will be brought out in the following part of the specification, wherein detailed description is for the purpose of fully disclosing the invention without placing limitations thereon.

BRIEF DESCRIPTION OF THE DRAWINGS

Referring to the accompanying drawings, which are for illustrative purposes only.

DESCRIPTION OF THE PREFERRED EMBODIMENT OF THE INVENTION

MODE OF OPERATION

Figure 1:
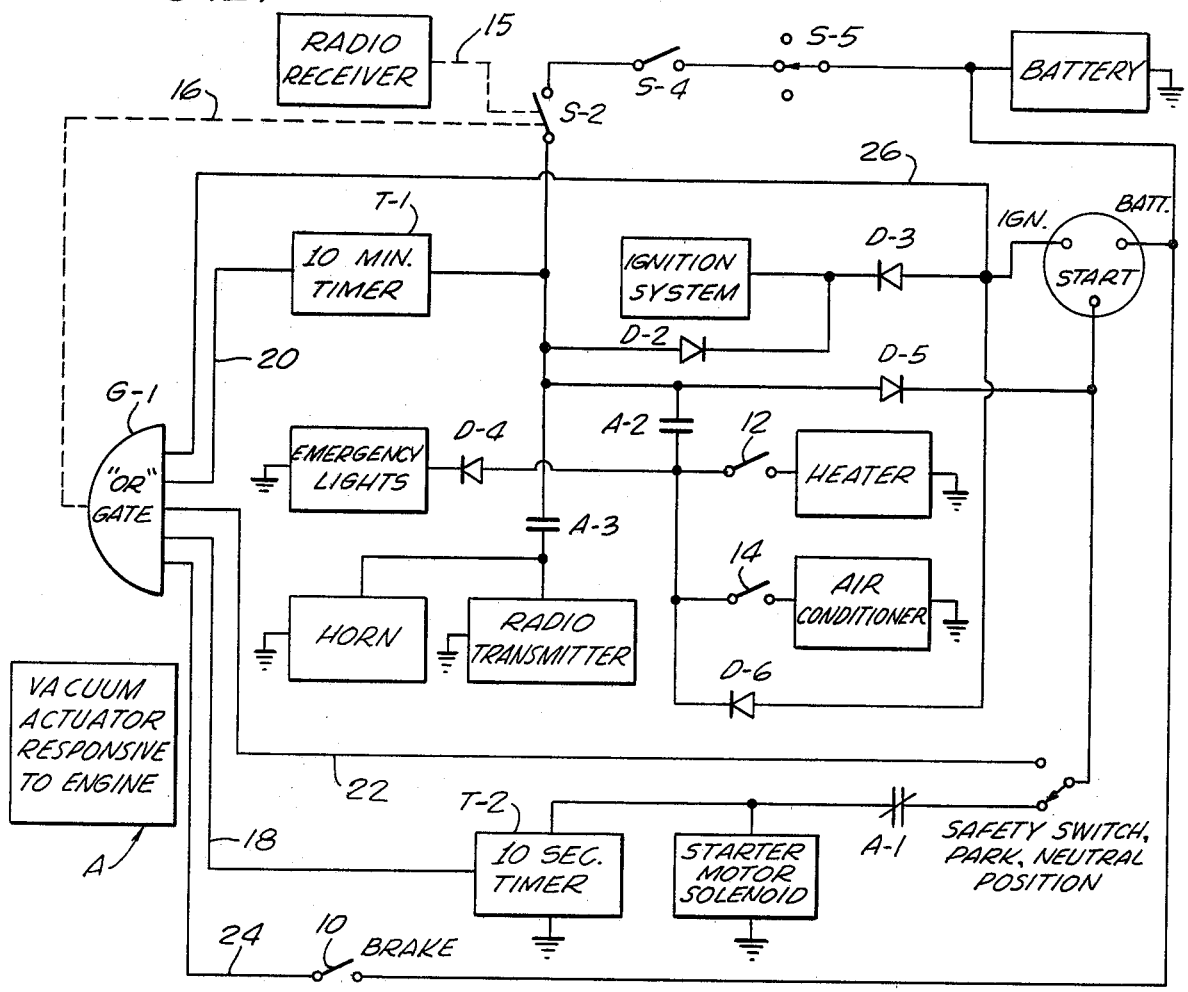
FIG. 1 is a simplified diagram of the remote control circuitry at the automobile, as embodied in our prior patent.

The manner in which the basic remote control system functions for its purpose may be readily understood by reference to the simplified diagram of FIG. 1.

FIG. 1 shows a portion of the usual or regular electrical circuit of the automobile including the car battery, the ignition system, the neutral safety switch which is operated by the gear shift lever, the starter motor solenoid, the brake lights that are operated by a brake switch 10, the car heater which is controlled by a dash switch 12, the air conditioner which is controlled by a dash switch 14, the emergency lights, and the usual horn. The connections to the emergency lights and the horn from the regular operating circuit are not shown.

The remote control system shown in FIG. 1 adds an auxiliary electrical circuit which is connected to the car battery in parallel with the regular electrical circuit. The auxiliary circuit includes three switches S-2, S-4 and S-5 in series with the car battery. Switch S-4 is a master on-off switch and switch S-5 is a hood safety switch which opens when the hood is raised but is provided with an override to keep the auxiliary circuit closed while the hood is raised if a mechanic at the hood so desires. As indicated by the dottted line 15, a radio receiver at the automobile is effective to close switch S-2 whenever the radio receiver is activated by a command signal from a remote control transmitter.

The auxiliary circuit includes an "OR" gate G-1 having five inputs. As indicated by the dotted line 16 an output signal from the gate G-1 is effective to open switch S-2 to break the auxiliary operating circuit.

The auxiliary circuit feature includes a fluid-pressure-responsive means which is responsive to starting of the automobile engine and which may take various forms in various practices of the invention. In this instance the fluid-pressure-responsive means which is designated "A" in the drawings is operated by the vacuum in the engine intake. Operation of the vacuum actuator "A" opens a pair of normally closed contacts A-1, closes a pair of normally open contacts A-2, and only momentarily closes a pair of normally open contacts A-3.

The closing of switch S-2 in response to a radio command signal causes the car battery to energize a long interval 10 minute timer T-1 and to energize the ignition system through a diode D-2. At the same time the battery is connected through a diode D-5 to one side of the usual neutral safety switch that is operated by the gear shift lever. With the neutral safety switch in its normal closed position, the normally closed pair of contacts A-1 energize both the starter motor solenoid and a short interval 10 second timer T-2.

If the engine does not start within the 10 second setting of timer T-2, the timer energizes gate G-1 through a line 18 to cause switch S-2 to de-energize the auxiliary circuit and thereby de-energize the starter motor solenoid as well as the ignition system. The opening of switch S-2 resets the remote control system to permit a subsequent radio command signal to initiate a new cycle.

If the engine does start while the 10 second timer is still running, the normally closed pair of contacts A-1 open to de-energize both the 10 second timer and the starter motor solenoid. The starting of the engine also closes the normally open pair of contacts A-2 to energize either the heater or the air conditioner. The closing of the normally open pair of contacts A-2 also energizes the emergency lights through diode D-4 to cause the emergency lights to flash and thereby provide a visual signal to indicate that the engine is running. The starting of the engine also momentarily closes the normally open pair of contacts A-3 to cause momentary energization of the horn and momentary energization of a radio transmitter at the car. The horn provides a brief audible signal to indicate that the engine has started and the momentary energization of the radio transmitter results in a radio signal indicating that the engine has started.

Once the engine has started it continues to run for a warm-up period that is terminated with the ten minute timer T-1 sends a signal through line 20 to gate G-1 to open switch S-2 to stop the engine. Thus, the auxiliary circuit is reset for subsequent operation by a radio command signal.

If an unauthorized person attempts to drive the car during the 10 minute running period, manual operation of the gear shift lever causes the neutral safety switch to connect the car battery to a line 22 to energize gate G-1 to cause switch S-2 to open, thereby stopping the engine. In like manner, if the brake pedal of the car is depressed during the running period the brake pedal switch 10 connects the battery to a line 24 to energize gate G-1 for opening of the switch S-2.

If the driver returns to the car and operates the ignition switch within the running period, the regular operating circuit of the car is thereby connected to the ignition system through diode D-3 and is connected to the heater and the air conditioner through diode D-6. At the same time the ignition switch connects the battery through a line 26 to gate G-1 to open the auxiliary operating circuit.

THE TRANSCEIVER FOR REMOTE CONTROL

Figure 2:
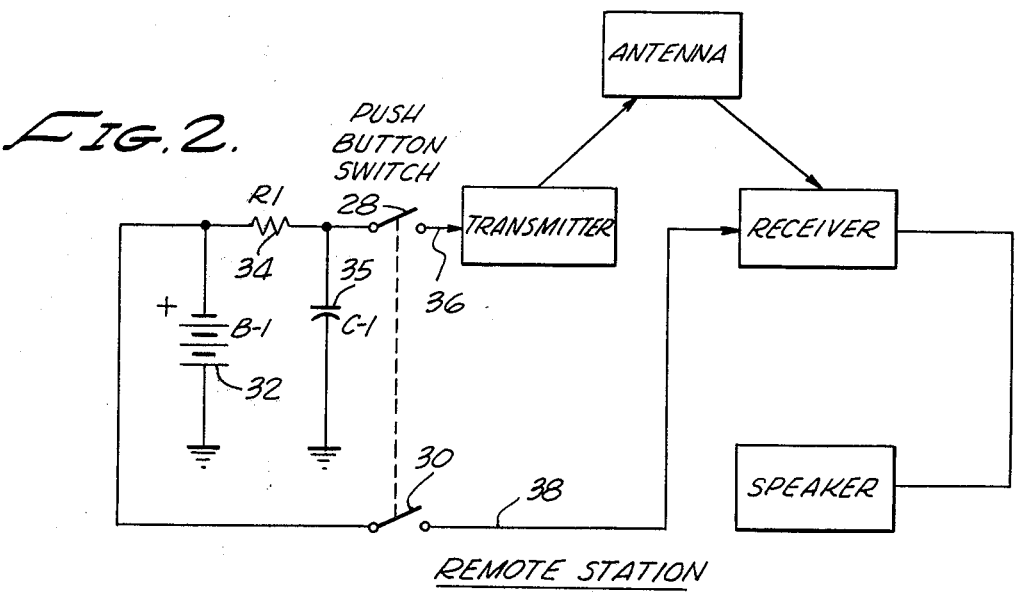
FIG. 2 is a simplified diagram of a pocket sized transceiver that is employed for remote control in the presently preferred practice of the invention.

FIG. 2 shows diagrammatically the novel features of a pocket-sized transceiver which is preferred for remote control. The transmitter and the receiver of the transceiver are both connected to a common antenna and the receiver is connected to a suitable speaker. A command signal is created by depressing a push button momentarily to momentarily close two switches 28 and 30. A battery 32 is connected to one side of switch 30 and is connected to one side of a resistor 34. The second side of the resistor 34 is connected to one side of a grounded capacitor 35 and to one side of the switch 28. The second side of the switch 28 is connected by a wire 36 to the transmitter and the second side of the switch 30 is connected by a wire 38 to the receiver.

Normally the capacitor 35 is fully charged with the two switches 28 and 30 open. The closing of switch 28 discharges the capacitor 35 to the transmitter 36 to create a radio command signal having a duration of approximately 1 second. At the same time the closing of the switch 30 energizes the receiver to inform the operator that a radio signal has been transmitted from the automobile's transmitter indicating that the engine is running.

When the push button is released to open the two switches 28 and 30, battery 32 recharges capacitor 35 through resistor 34 but by virtue of the retarding affect of the resistor it requires approximately 1 minute for the capacitor to be fully charged to the voltage of the battery. Thus, over a period of approximately 1 minute the voltage on the positive side of the capacitor 35 increases from zero to the voltage of the battery. The transmitter has an operating threshold that is just under the voltage of the battery 32 so that the capacitor 35 must be substantially fully charged to cause the transmitter to send a radio command signal to the receiver on the automobile. Thus, the capacitor 35 limits the duration of a command radio signal to approximately 1 second, and in conjunction with the resistor 34 limits to approximately 1 minute the off period between successive radio command signals. Because of the limitation imposed on the duration of the on and off periods of the radio signals, no FCC license will be required and more power can be used, resulting in operation over longer distances than is now possible.

SPECIFIC DETAILS OF THE REMOTE CONTROL CIRCUITRY

Figure 3:
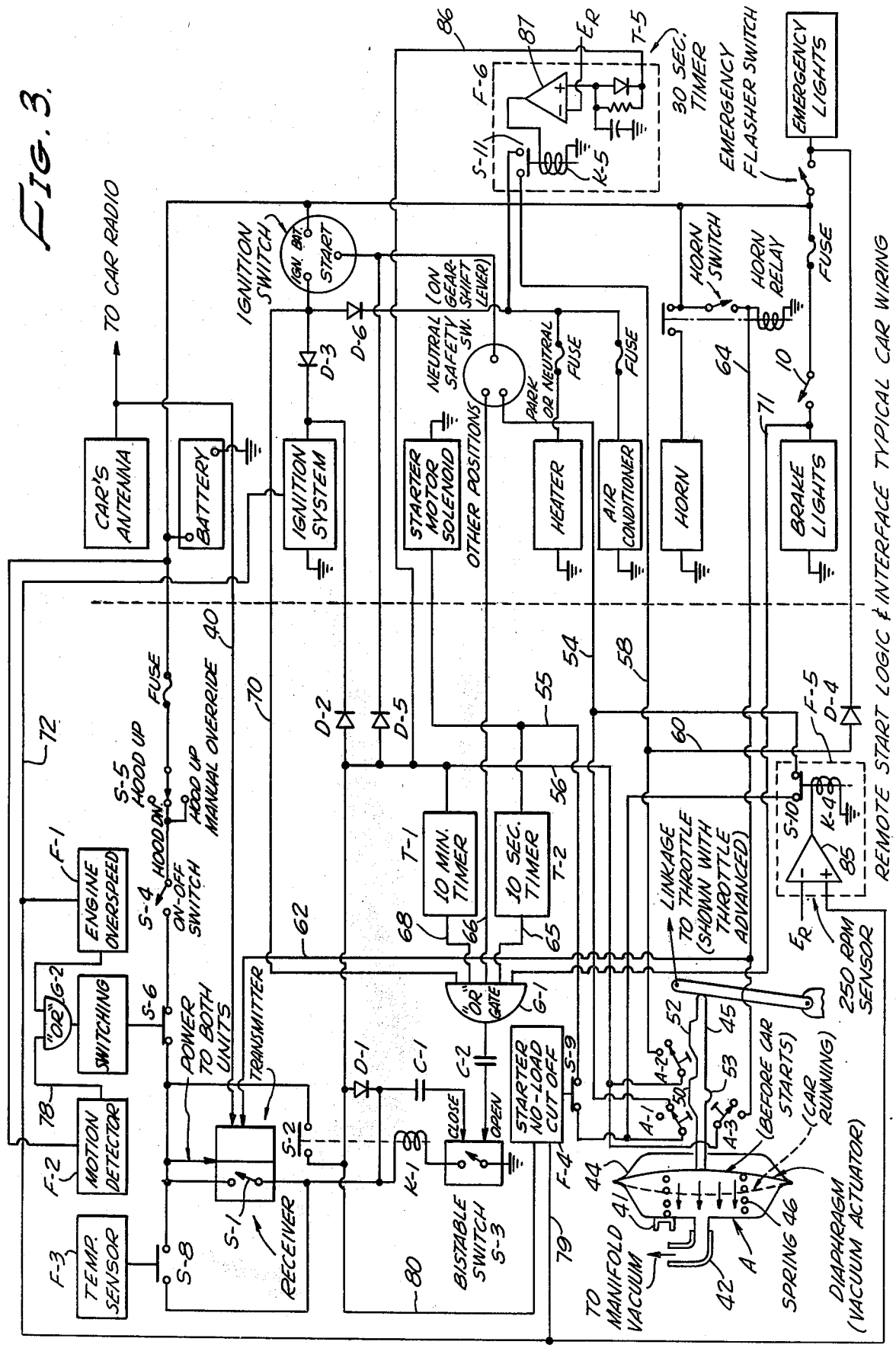
FIG. 3 is a more detailed diagram of the remote control system on the automobile, including the improvements according to the present invention.

FIG. 3 shows specific details of the basic remote control system that is represented by the simplified diagram in FIG. 1, and the improvements according to the present invention.

The receiver is connected to the car's antenna by a wire 40 to receive remotely controlled command signals through the car's antenna. As indicated in the diagram, a transmitter is combined with the receiver and both are in series with switches S-4, S-5 and S-6 for energization by the car battery. The previously mentioned switch S-2 is in parallel with the receiver and transmitter and is in series with the two switches S-4 and S-5 as heretofore explained. The receiver incorporates a normally open switch S-1 which closes in response to and for duration of a radio command signal. The closing of switch S-1 energizes a coil K-1 that is in series with a normally closed grounded bi-stable switch S-3. Energization of the coil K-1 closes switch S-2 and latches switch S-2 in closed position through diode D-1, coil K-1 and switch S-3. The bi-stable switch S-3 closes in response to a signal from the receiver through a capacitor C-1 and opens in response to a signal from the gate G-1 through a capacitor C-2. The gate G-1 has five inputs, and any one of five input signals will open switch S-3 to open switch S-2 to de-energize the auxiliary operating system at the automobile.

The vacuum device "A" which is mounted on an adjustable bracket 41 is connected by a tube 42 to the engine intake for operation in response to a vacuum that is created in the engine intake when the engine starts. Vacuum device "A" incorporates a diaphragm 44 which is unitary with an axial operating member 45. A coil spring 46 acting on the diaphragm normally maintains the operating member 45 in such a position as to advance the normal throttle linkage. When a vacuum is created in the intake manifold by the starting of the engine, the vacuum flexes the diaphragm 44 leftward to a bowed position indicated by the dotted line, the normal function of the diaphragm being to retract the operating member 45 to permit the throttle linkage to slowly move to the engine-idle position and control the three pairs of contacts A-1, A-2, and A-3 by means of the operating member 45.

The operating member 45 is provided with a cam 50 to open the normally closed pair of contacts A-1, and a cam 52 to close the normally open pair of contacts A-2. In addition, the operating member 45 has a relatively small cam 53 which momentarily closes the normally open pair of contacts A-3 in the course of the longitudinal retraction movement of the operating member. It is obvious that the operation of the vacuum actuator may be adjusted by adjusting the bracket 41 and that the three switches A-1, A-2 and A-3 may be individually adjusted to provide the sequence desired for a particular engine.

As heretofore stated, when switch S-2 is closed in response to a radio command signal the car battery is connected to the 10 minute timer T-1 and also is connected to the ignition system through the diode D-2 and is connected to one side of the neutral safety switch through diode D-5. With neutral safety switch in its normal closed position it connects the car battery to a wire 54 leading to one side of the normally closed pair of contacts A-1 and the other side of the normally closed pair of contacts is connected by a wire 55 to one side of the 10 second timer T-2 and one side of the starter motor solenoid.

The closing of switch S-2 not only starts timer T-1, but also energizes a wire 56 which is connected both to one side of the normally open pair of contacts A-2 and on one side of the normally open pair of contacts A-3. The second side of the normally open pair of contacts A-2 is connected by a wire 58 to the car heater and the car air conditioner by closure of the normally open contacts of a switch S-10 and is connected by a wire 60 through a diode D-4 to turn on the emergency lights. The second side of the normally open pair of contacts A-3 is connected to the transmitter by a wire 62 and is connected to the horn relay by a wire 64. The ignition switch is connected to the ignition system through a diode D-3 and is connected to the car heater and the car air conditioner through a diode D-6.

The five leads to the input side of the gate G-1 comprise: a wire 71 in series with the brake pedal switch 10; a wire 65 from the 10 second timer T-2; a wire 66 that is energized when the gear shift lever is moved out of either park or neutral; a wire 68 from the 10 minute timer T-1; and a wire 70 from the ignition switch.

An engine overspeed circuit F-1 is connected to a wire 72 which is connected to an RPM signal generating source such as the points of a distributor or a "tach" signal output of a solid state ignition, and compares this signal to an internal preset signal level. If the engine RPM exceeds the preset level, for example, on the order of 3500 RPM, then F-1 operates through an input connection with an "OR" gate G-2 to activate connected switching and open the normally closed contacts of switch S-6 which are in series with the switches S-4 and S-5 of the battery power supply line. Operation of switch S-6 removes all power to the starter and ignition system and thus prevents the engine from running at excessive speed because of any mechanical malfunctions.

Figure 4:
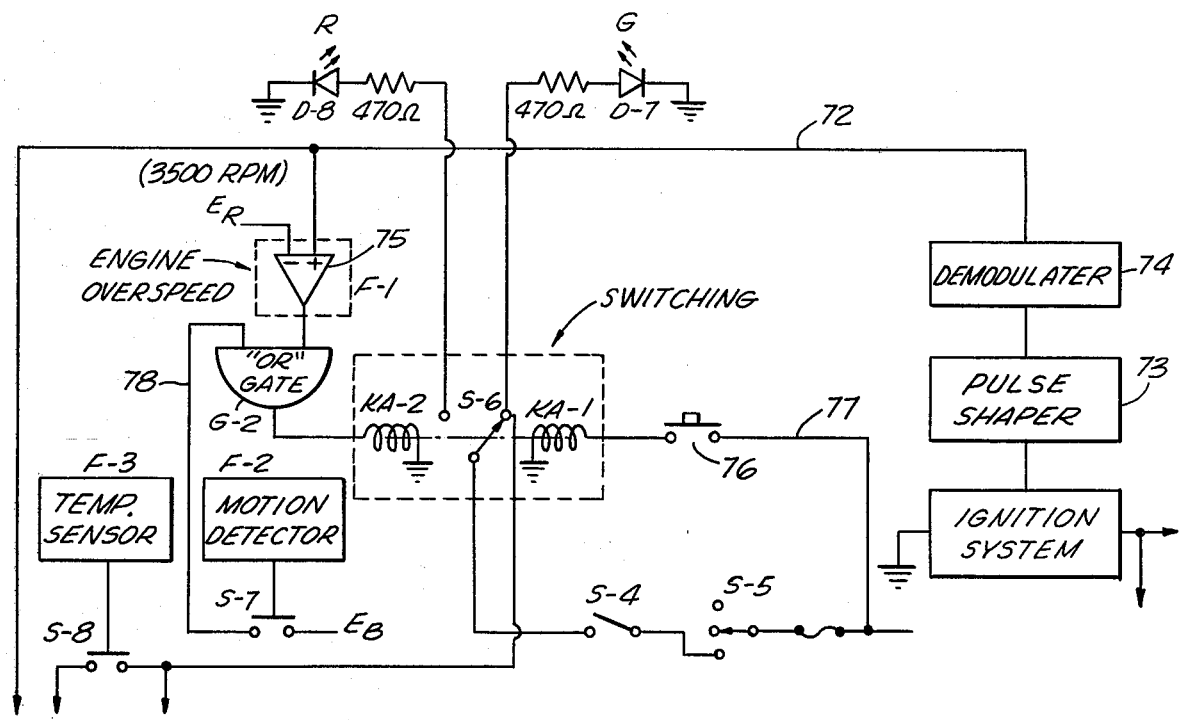
FIG. 4 is a detailed circuit diagram of the means for converting pulses of the ignition system into an analog DC voltage proportional to the engine RPM, and circuitry of the engine overspeed and associated switching means.

As more specifically shown in FIG. 4, the RPM signal source is shown as being connected with the ignition system so as to utilize pulses produced by the distributor points, a pulse shaper 73 being utilized to shape the pulses and produce constant amplitude, constant width pulse signals. A connected demodulator 74 converts the pulses to an analog DC voltage proportional to engine RPM, these signal pulses being fed to a comparator 75 of the engine overspeed F-1, which compares the RPM voltage signal to a reference voltage ER which is equivalent to, for example, 3500 RPM. The output of the comparator 75 is logic 1, if the RPM exceeds 3500 RPM.

The switching arrangement of the switch S-6 comprises normally closed contacts that are reset by energizing a coil KA-1 by means of a manual push-button switch 76 which upon being depressed connects the coil with the battery circuit through connection wire 77. With the contacts of switch S-6 in their normally closed position, a green indicating light in the form of a light emitting diode D-7 is energized to indicate that the engine may be started. Upon the occurrence of an engine overspeed condition, gate G-2 will operate to energize coil KA-2 so as to close the normally open contacts of switch S-6 and energize the light emitting diode D-8 and produce a red warning signal.

A motion detector F-2 is arranged to respond to forward and reverse movements of the vehicle by the closure of the normally open contacts of a switch S-7 which operates to connect battery voltage EB through a wire 78 to an input of gate G-2 and thus energize coil KA-2 and open the normally closed contacts of switch S-6 and thereby remove all power to the starter and ignition system. This protective feature is particularly desirable in that it prevents the vehicle from lurching forward or backward or running out of control in the event that the gear shift lever is inadvertently moved from the "park" or "neutral" position to either "reverse" or "drive" positions. It also prevents an automobile equipped with a manual transmission from starting when the transmission is inadvertently left in gear.

A temperature sensor F-3 is arranged to close a normally open switch S-8 when ambient temperature falls below a preset level. This switch is in parallel connected relation to switch S-1, and as thus connected functions to initiate a starting operation of the engine in the same manner as the receipt of a command signal operates to close switch S-2. This feature is of particular benefit in cold climates, and permits the vehicle engine to be started automatically, as necessary, in order that vital parts and lubricants will be kept warm and operable.

Figure 5:
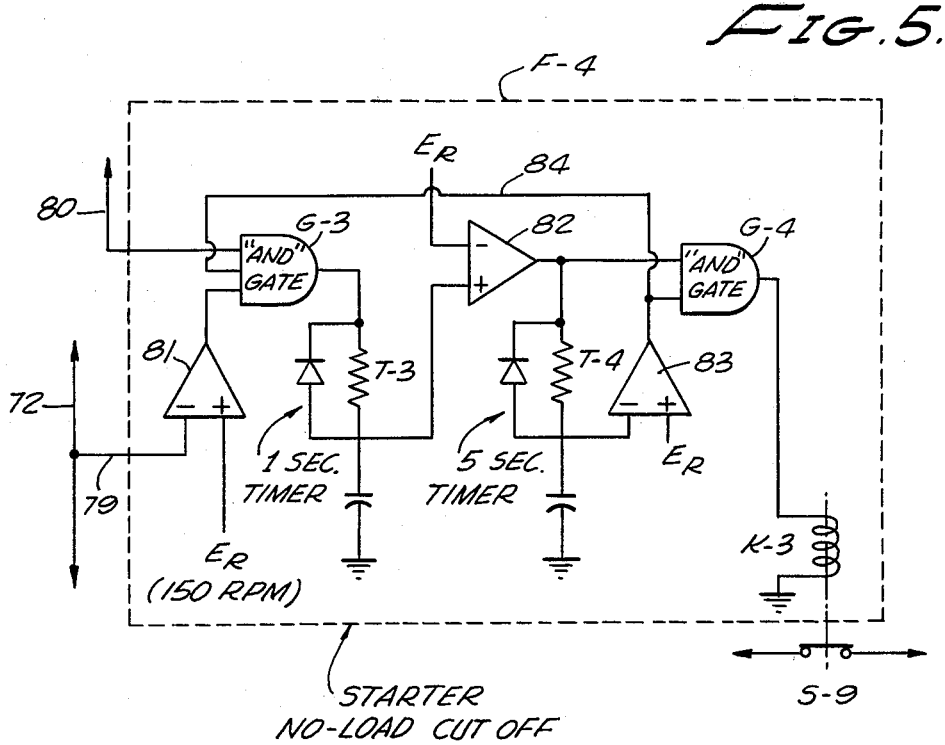
FIG. 5 is a detailed circuit diagram of the starter no-load cutoff.

A starter no-load cutoff F-4, as best shown in FIG. 5, is connected by wire 79 to wire 72 for reception of the generated RPM signal, and by a wire 80 to the output side of switch S-2. Thus, if switch S-2 is closed as a result of having received a command starting signal, and the engine RPM level is less than a preset level for a period of one second, then F-4 will operate to open normally closed switch S-9 and disconnect the starter motor for a period of 5 seconds during which a start command will be ineffective to energize the starting motor. More specifically, comparator 81 output is logic 1, if the engine RPM is less than, for example, a reference voltage corresponding to 150 RPM. Comparator 81 output is connected to provide one input to an "AND" gate G-3 while wire 80 from the output of switch S-2 provides another input connection to the gate. The output of gate G-3 connects with a 1 second timer circuit T-3 which is effective after a 1 second interval to complete a connection to a comparator 82, the output of which is logic 1 if the engine RPM is less than 150 RPM for a period of 1 second after the engine starting command is received. A timing circuit T-4 with a comparator 83 has its output connected to an "AND" gate G-4, the other connection to the gate being from comparator 82. The gate output energizes an actuating coil K-3 to open the normally closed contacts of switch S-9 for a period of 5 seconds during which time a restarting signal will be ineffective. The starter no-load cutoff is a very desirable protective feature for the reason that, if the starter motor fails to engage the flywheel and consequently turn the engine over, the cutoff system removes power to the starter motor in order to prevent burn-out. The 5 second "lock out" allows the starter motor to wind down before a restart is possible. A wire 84 connected between the output of comparator 83 and forming an input connection to gate G-3 provides for automatic reset of the timers T-3 and T-4.

Referring again to FIG. 3, an RPM sensor F-5 provides an alternative method of sensing that the engine is running and commands that the starter motor be disengaged once the engine is running. As shown, a comparator 85 has a logic 1 output if the engine RPM exceeds, for example, 250 RPM. The comparator operates to energize the actuating coil K-4 to open the normally closed contacts of switch S-10 which is in parallel relation to the contacts A-1 of the vacuum actuator "A".

An accessory timer F-6 is provided to delay the energization of the heater and air conditioner for a time interval of 30 seconds in order to reduce the electrical load on the battery while starting. As shown, a timing circuit T-5 is connected by a wire 86 to the output side of switch S-2. When this switch is closed, the timer T-5 operates to energize a comparator 87 and after an interval of 30 seconds operates to energize a coil K-5 to close the normally open contacts of switch S-11 and complete an energizing circuit to the accessories by way of vacuum actuator contacts A-2.

From the foregoing description and drawings, it will be clearly evident that the delineated objects and features of the invention will be accomplished.

Various modifications may suggest themselves to those skilled in the art without departing from the spirit of our invention and, hence, we do not wish to be restricted to the specific forms shown or uses mentioned, except to the extent indicated in the appended claims.

We claim:

1. A remotely controlled starting and control system for an internal combustion engine of an unattended vehicle, in which switching means are operative upon receipt of a remotely transmitted command signal to connect and disconnect an associated starter motor and ignition system to an energy source, the improvement comprising:

a solenoid actuated switch for controlling the operation of the starter motor;

normally closed contacts in an energizing circuit of said solenoid;

means responsive to engine operation for continuously generating an output signal indicative of the engine operating RPM;

means controlled by said output signal for actuating the normally closed contacts to an open position, when the RPM is less than a preset level for a predetermined first time interval; and means operable in response to the operation of said actuating means to open said normally closed contacts, for preventing reclosure of said contacts until the expiration of a predetermined second time interval.

2. A control system according to claim 1, in which: the first time interval is of the order of 1 second, and the second time interval is of the order of 5 seconds.

3. A remotely controlled starting and control system for an internal combustion engine of an unattended vehicle, in which switching means are operative upon receipt of a remotely transmitted command signal to connect an associated starter motor and ignition system to an energy source, the improvement comprising:

means responsive to engine operation for continuously generating an output signal indicative of the engine operating speed;

means for controlling the activation of said switching means in response to said output signal, and being operative to cause actuation of the switching means to disconnect said starting motor and ignition system from the energy source, when said output signal corresponds to a preset overspeed of the engine;

said switching means includes a switch having normally closed contacts in an energizing circuit from said energy source to said starter motor and said ignition system;

an actuating coil energizable by said generated output signal and being operative to move said contacts to an open position upon the occurrence of said overspeed;

a second actuating coil energizable to move said contacts from said open position to said closed position; and a manually operable push-button for controlling the energization of said second actuating coil.

4. A remotely controlled starting and control system for an internal combustion engine of an unattended vehicle, in which switching means are operative upon receipt of a remotely transmitted command signal to connect an associated starter motor and ignition system to an energy source, the improvement comprising:

means responsive to engine operation for continuously generating an output signal indicative of the engine operating speed;

means for controlling the activation of said switching means in response to said output signal, and being operative to cause actuation of the switching means to disconnect said starting motor and ignition system from the energy source, when said output signal corresponds to a preset overspeed of the engine;

said switching means includes a switch having normally closed contacts in an energizing circuit from said energy source to said starter motor and said ignition system;

an actuating coil energizable by said generated output signal and being operative to move said contacts to an open position upon the occurrence of said overspeed;

said switch also having normally open contacts which are adapted to close, upon movement of the normally closed contacts to open position;

a green indicating light circuit being activated by the normally closed contacts; and a red indicating light circuit being activated by the closure of the normally open contacts.

5. A remotely controlled starting and control system for an internal combustion engine of an unattended vehicle, in which switching means are operative upon receipt of a remotely transmitted command signal to connect an associated starter motor and ignition system to an energy source, the improvement comprising:

means responsive to engine operation for continuously generating an output signal indicative of the engine operating speed;

means for controlling the activation of said switching means in response to said output signal, and being operative to cause actuation of the switching means to disconnect said starting motor and ignition system from the energy source, when said output signal corresponds to a preset overspeed of the engine;

said switching means includes a switch having normally closed contacts in an energizing circuit from said energy source to said starter motor and said ignition system;

an actuating coil energizable by said generated output signal and being operative to move said contacts to an open position upon the occurrence of said overspeed;

a comparator for comparing the generated output signal with a reference voltage indicative of a predetermined engine speed level;

said actuating coil having an energizing circuit connected to the output of said comparator, and being operative when the engine speed exceeds said predetermined engine speed level to actuate said contacts to open position;

the output of said comparator comprising one input connection to an "OR" gate having its output connected to an energizing circuit of said actuating coil; and a motion detector being operable to connect a power source to a second input connection of the "OR" gate, in response to forward or reverse movement of the vehicle in which said engine is mounted.

6. A remotely controlled starting and control system for an internal combustion engine, in which switching means are operative upon receipt of a command signal to connect and disconnect an associated starter motor and ignition system to an energy source, the improvement comprising:

a solenoid actuated switch for controlling the operation of the starter motor;

normally closed contacts in an energizing circuit of said solenoid;

means responsive to engine operation for generating an output signal indicative of the engine RPM;

a first comparator for comparing said output signal with a reference voltage corresponding to approximately 150 RPM;

a first "AND" gate having an input connection to the output of said comparator and an input connection with said energy source;

a 1 second timing circuit connected between the output of said gate and an input of a second comparator;

said second comparator having another input connection with a reference voltage, and an output connection;

a second "AND" gate having one input connection with the output connection of the second comparator;

a 5 second timing circuit, connected between the output connection of said second comparator and one input of a third comparator;

said third comparator having another input connection with a reference voltage, and an output connection providing another input connection of the second "AND" gate; and an actuating coil for said normally closed contacts having an energizing circuit connection with the output of the second "AND" gate.

7. A control system according to claim 6, which includes:

a feedback connection between the output of said third comparator and another input connection of the first "AND" gate for resetting said timing circuits.

* * * * *